Figure 1:
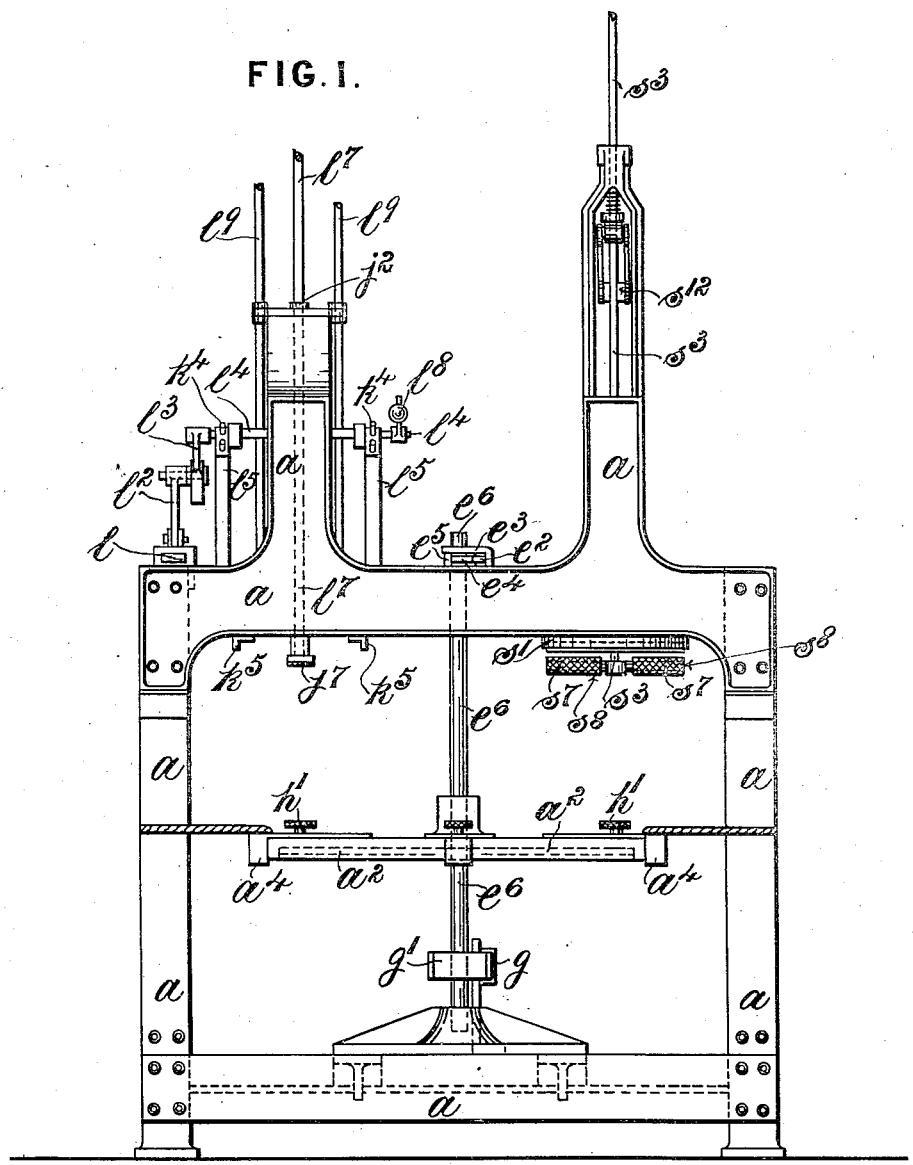

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 1.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 3.

Witnesses.
Joseph Benton.
Charles Orton.

Inventor.
F. Mountford
By William B. Taylor
atty.

No. 884,031. PATENTED APR. 7, 1908.
F. MOUNTFORD.
APPARATUS FOR DECORATING POTTERY AND OTHER WARE.
APPLICATION FILED FEB. 1, 1907.

19 SHEETS—SHEET 4.

FIG. 4.

Witnesses.
Joseph Benton.
Charles Orton.

Inventor.
F. Mountford
By William B. Taylor
Atty.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 5.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 6.

Witnesses.
Joseph Benton.
Charles Orton.

Inventor.
F. Mountford
By William D. Taylor
Atty.

No. 884,031. PATENTED APR. 7, 1908.
F. MOUNTFORD.
APPARATUS FOR DECORATING POTTERY AND OTHER WARE.
APPLICATION FILED FEB. 1, 1907.

19 SHEETS—SHEET 7.

Witnesses.
Joseph Benton.
Charles Orton.

Inventor.
F. Mountford
By William B. Taylor
Atty.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 8.

Witnesses.
Joseph Benton.
Charles Orton.

Inventor.
F. Mountford
By William B. Taylor
Atty.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 9.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 10.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 11.

No. 884,031.　　　　　　　　　　　　　PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 12.

Witnesses.
Joseph Benton.
Charles Orton.

Inventor.
F. Mountford
By William B Taylor
Atty.

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 13.
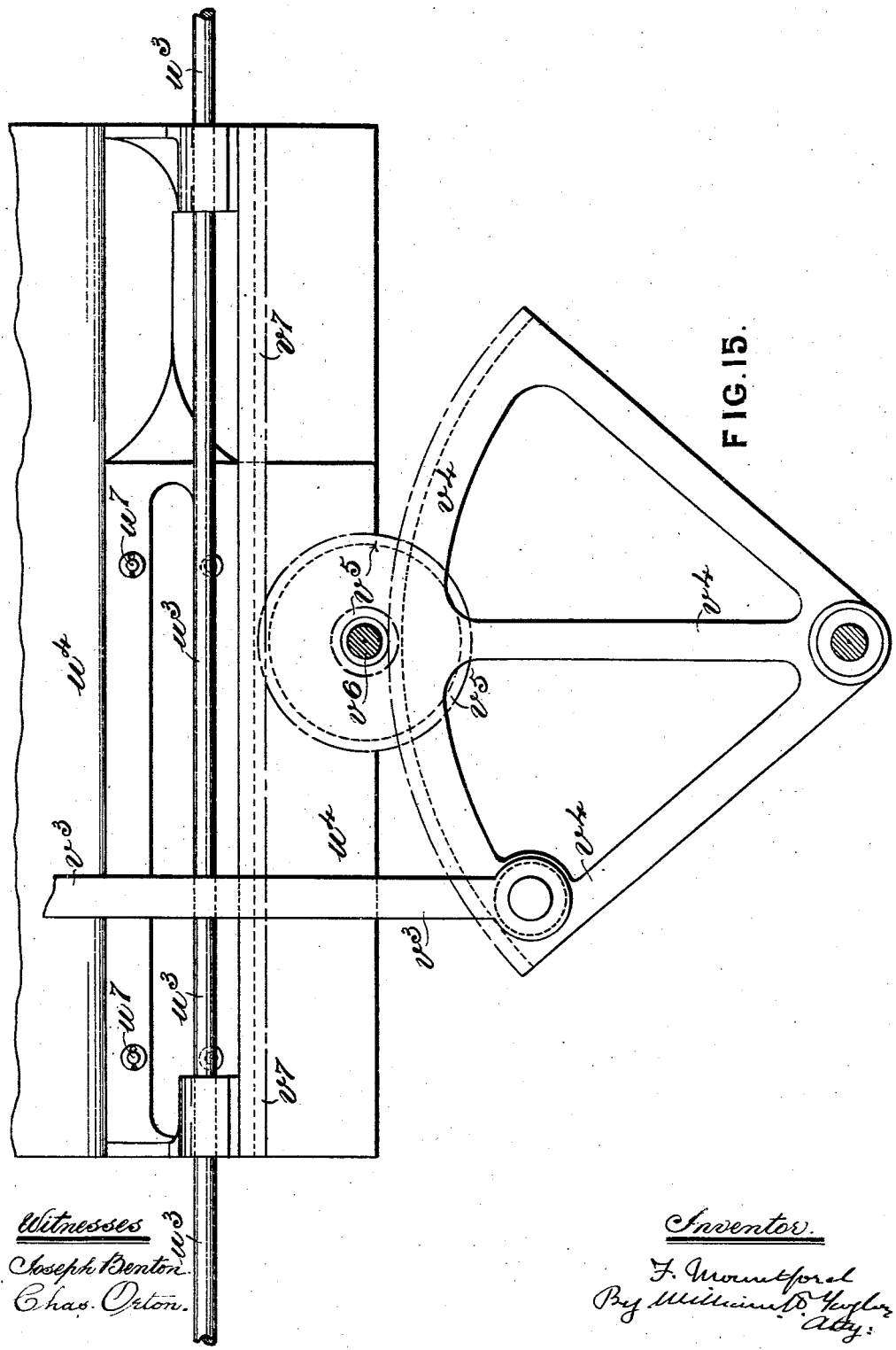

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 14.

Witnesses
Joseph Benton
Charles Orton

Inventor
F. Mountford

No. 884,031. PATENTED APR. 7, 1908.
F. MOUNTFORD.
APPARATUS FOR DECORATING POTTERY AND OTHER WARE.
APPLICATION FILED FEB. 1, 1907.
19 SHEETS—SHEET 15.

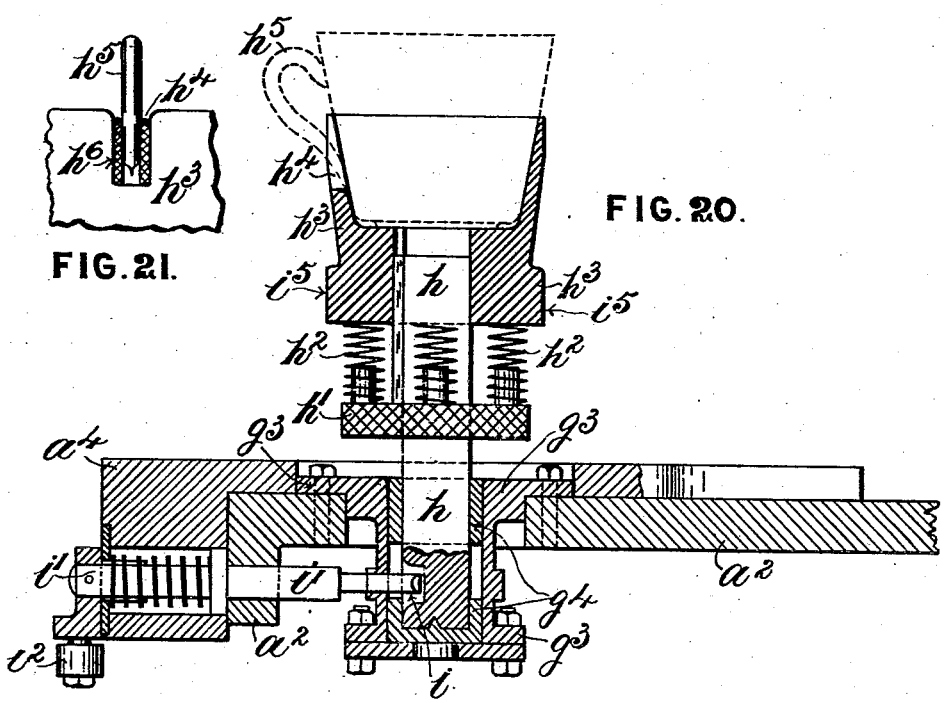
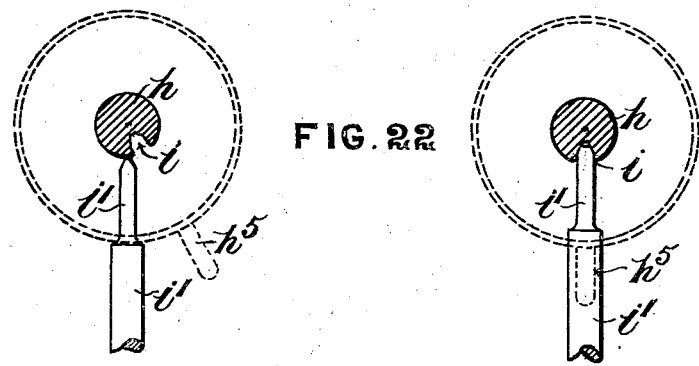

No. 884,031. PATENTED APR. 7, 1908.
F. MOUNTFORD.
APPARATUS FOR DECORATING POTTERY AND OTHER WARE.
APPLICATION FILED FEB. 1, 1907.

19 SHEETS—SHEET 17.

Witnesses.
Joseph Benton.
Charles Orton.

Inventor.
F. Mountford

No. 884,031. PATENTED APR. 7, 1908.
F. MOUNTFORD.
APPARATUS FOR DECORATING POTTERY AND OTHER WARE.
APPLICATION FILED FEB. 1, 1907.

19 SHEETS—SHEET 18.

Witnesses.
Joseph Benton.
Charles Orton.

Inventor.
F. Mountford
By William B. Tyler
Atty.

No. 884,031. PATENTED APR. 7, 1908.
F. MOUNTFORD.
APPARATUS FOR DECORATING POTTERY AND OTHER WARE.
APPLICATION FILED FEB. 1, 1907.

19 SHEETS—SHEET 19.

Witnesses
Joseph Benton.
Charles Orton.

Inventor.
F. Mountford
By William B. Taylor
Atty.

UNITED STATES PATENT OFFICE.

FREDERICK MOUNTFORD, OF LONGTON, ENGLAND.

APPARATUS FOR DECORATING POTTERY AND OTHER WARE.

No. 884,031.  Specification of Letters Patent.  Patented April 7, 1908.

Application filed February 1, 1907. Serial No. 355,238.

*To all whom it may concern:*

Be it known that I, FREDERICK MOUNTFORD, a subject of the King of Great Britain and Ireland, and resident of Longton, in the county of Stafford, England, engineer, have invented a Machine or Apparatus for Decorating Pottery and other Ware, of which the following is a specification.

This invention relates to a machine or apparatus for decorating cups, jugs, basins, saucers, plates and all kinds of flat or hollow ware, and other pottery ware, paper, papier mâché, metallic, glass, wood celluloid, enamel or other articles of the nature referred to or in other words ware or similar articles which can be held upon a stationary or revoluble block, chuck, or center while the article itself or the block or chuck is capable of rotation or both capable of rotation together while the decoration is being carried on. Such decoration may be accomplished in a single or in plurality of colors such colors or decorative material including metallic bronzes, gold, silver, oil, varnishes or the like.

Figure 5:
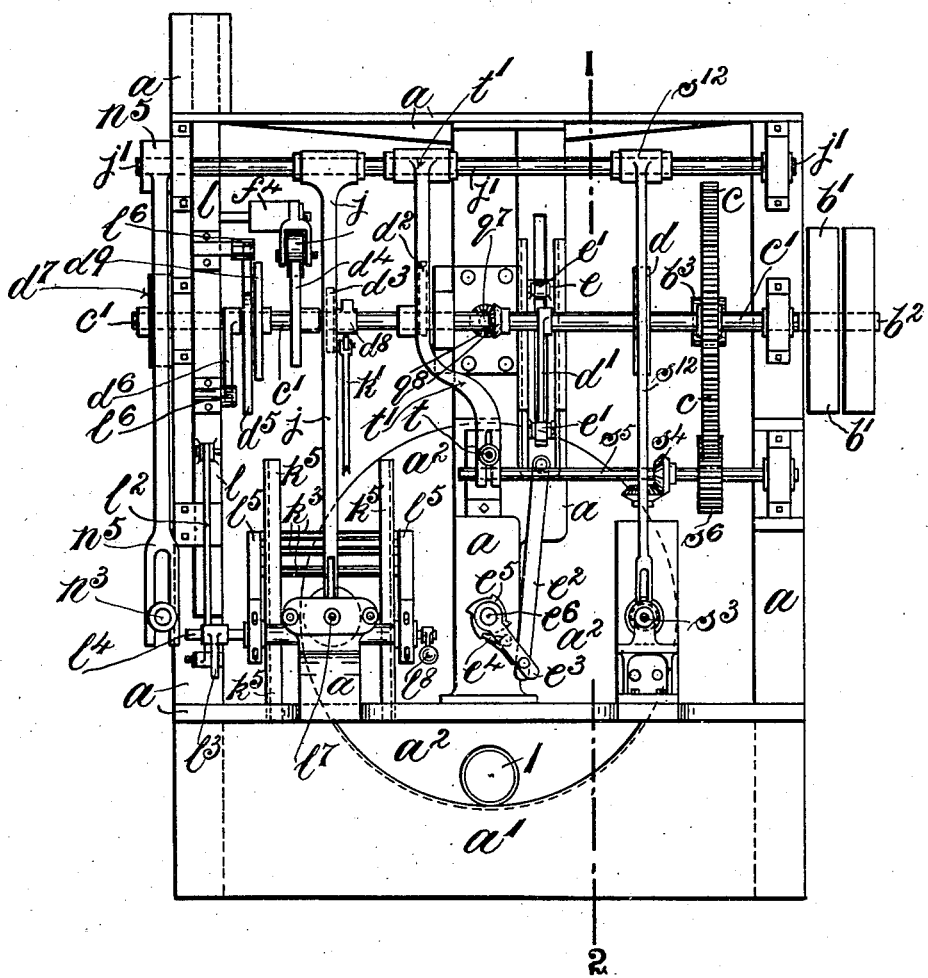
Figures 16, 16A:
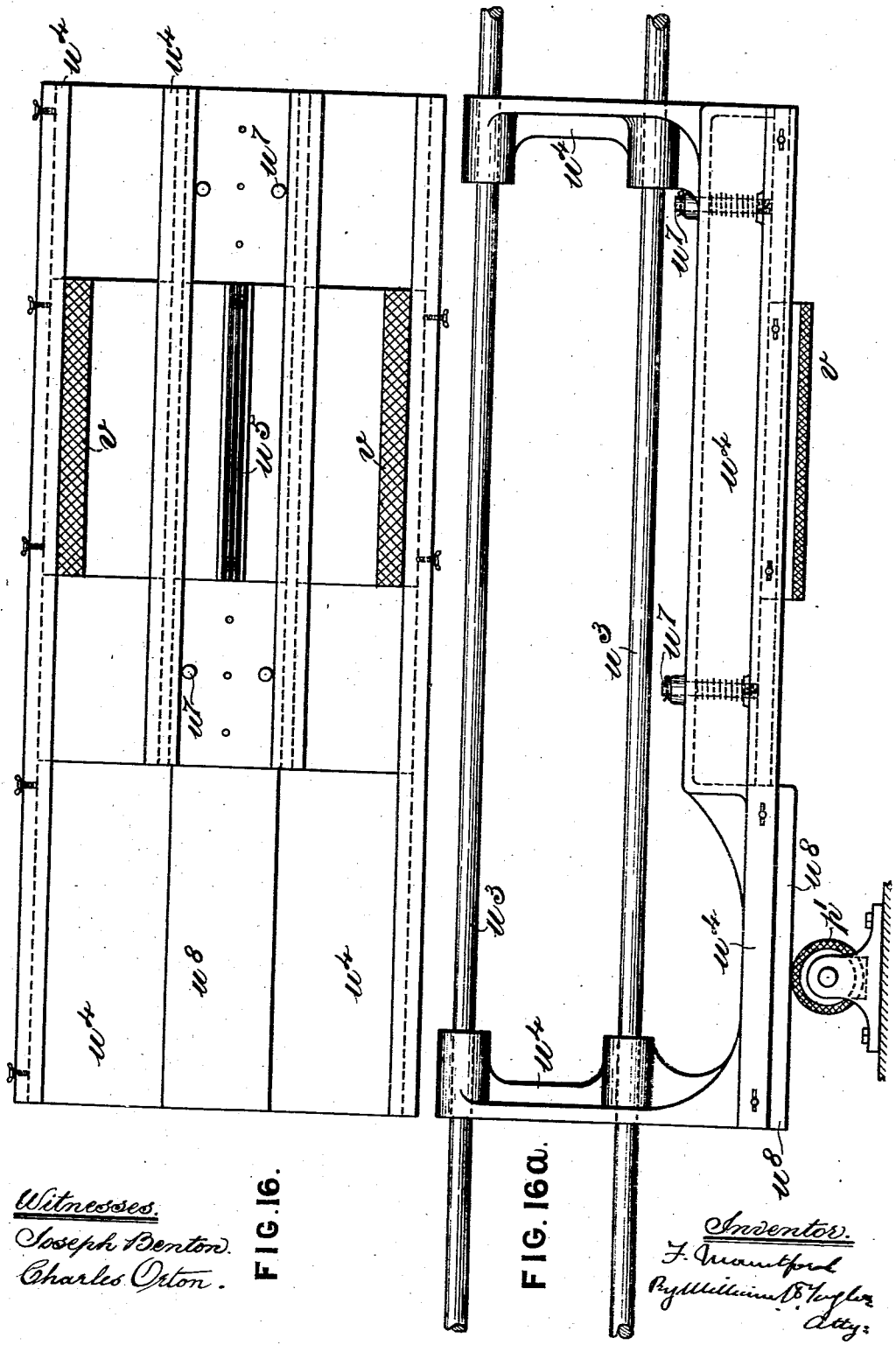
Figure 26:
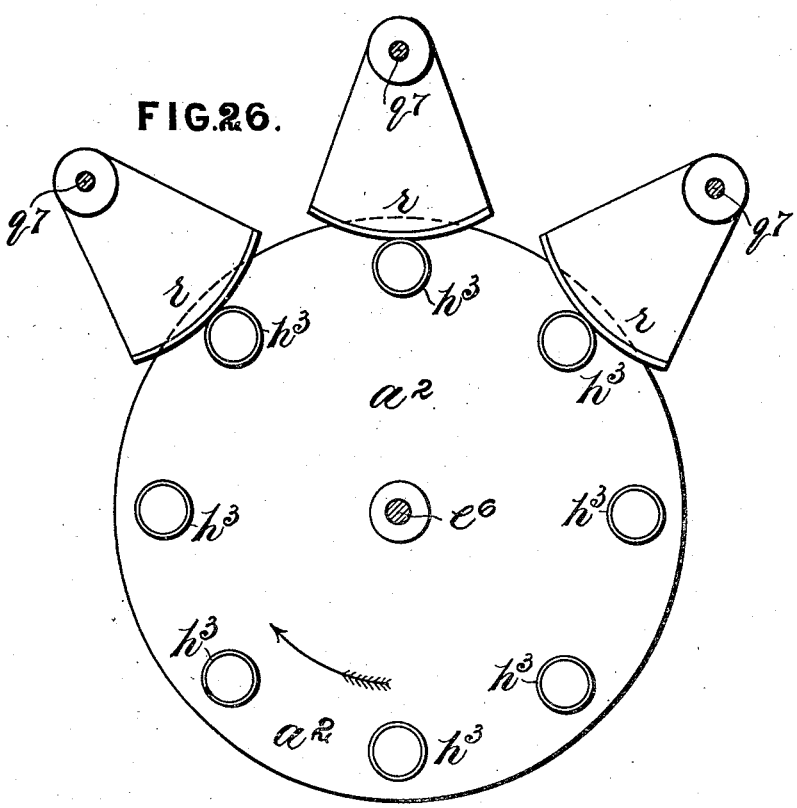
Figure 27:
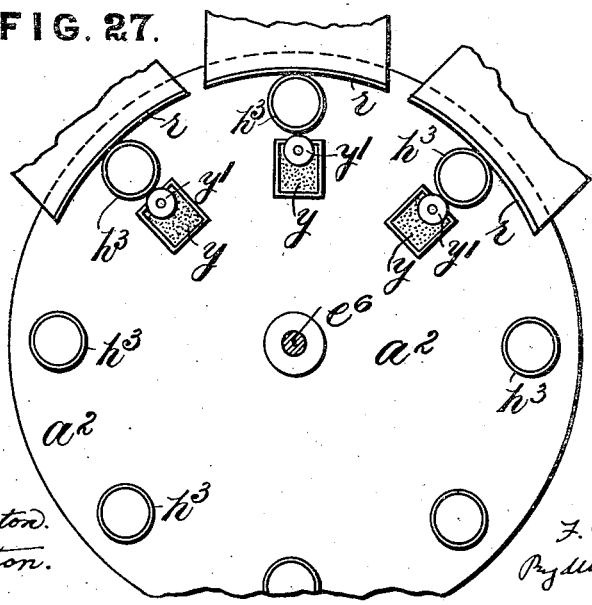
Figure 28:
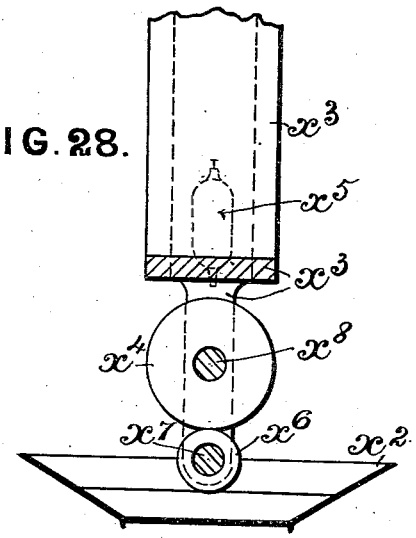
Figure 29:
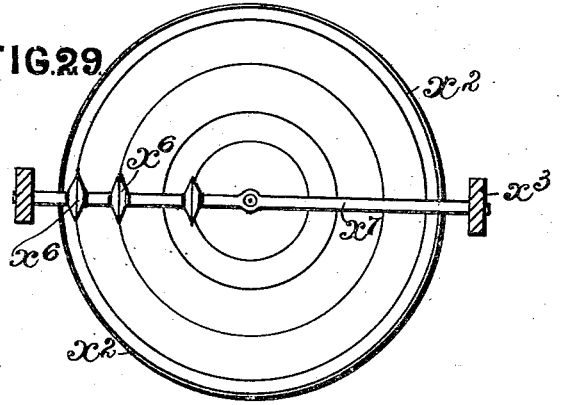

My invention will be fully described with reference to the accompanying drawings which indicate a complete machine and also several modifications all of which will be described and in which Figure 1 is a front elevation of the machine with the stationary table removed, Fig. 2 side elevation from the right hand end of the machine, Fig. 3 elevation from the opposite end, Fig. 4 sectional elevation on line 1, 2 of Fig. 5 and Fig. 5 plan. The remaining details of the machine are shown to an enlarged scale and also include modifications of some of the devices. These drawings comprise in Fig. 6 side elevation of the mechanism for decorating the bottom of the cup or other article at its interior, Fig. 7 back elevation of same, Fig. 8 detail elevation partly in section of the apparatus shown in Figs. 6 and 7 adapted for decorating the inside of a saucer, plate, dish, or similar article, Figs. 9 and 9ª side elevations of the device for decorating the handle of a cup or similar article, Fig. 10 front elevation of same, Fig. 11 plan of the device for decorating the exterior of a cup or similar article, Fig. 12 side elevation of same, Fig. 13 plan, showing modified means for enabling the decorating or pattern device to be readily interchanged with others of different character, Fig. 14 end elevation, partly in section, showing a modified device for decorating the exterior surface of a cup or similar article, Fig. 15 back elevation of said device, Figs. 16 and 16ª front elevation and plan of the device, Fig. 17 plan of a revolving table carrying the articles to be decorated and showing means for automatically enabling the articles to be decorated to be rotated, Fig. 18 elevation and sectional elevation, respectively, of device for holding the cup or the like in an axial direction while being decorated, Fig. 19 elevation partly in section and partial plan, respectively, showing modified device for decorating the handles of cups or the like, Fig. 20 partial sectional elevation showing the means for carrying a cup or similar article to be decorated, Fig. 21 detail elevation of cup holding device, Fig. 22 partial sectional plans relating to the cup holding device, Fig. 23 plan showing modified means for holding the decorating device for the outside of a cup or the like, Fig. 24 plan showing a further modification of the same device for enabling a plurality of colors to be applied to the article and Fig. 25 sectional elevation showing modified means enabling the extreme edge of a saucer or for similar article to be decorated. Fig. 26 is a diagrammatic plan indicating a plurality of devices for enabling several colors to be transferred to the ware to be decorated and includes means for enabling bronze powders or other powders to be dusted on to the design after being transferred thereto by the external apparatus. Fig. 27 indicates a further modification in which the design surfaces are hollow and stationary while the table carrying the ware or articles to be decorated is rotated continuously. Figs. 28 and 29 sectional elevation and plan respectively showing a modified saucer decorating device.

In carrying out my invention I provide a framework $a$ designed in a suitable way to carry the whole of the mechanism for carrying out the various purposes, $a^1$ being a stationary table at the front of the machine at which an operator may stand and supply the undecorated ware to the machine and afterwards remove it on decoration being accomplished.

$a^2$ is a table to which a step by step or intermittent or in some cases continuous rotary motion is given, preferably the former so that the inside base of the cup, handle, top edge, or outer surface can be decorated in one or several colors but for the general purposes of my invention the principal parts of the following description will refer to decoration by means of one color or gold only.

The machine is driven by power from a belt pulley $b^1$ located on a shaft $b^2$ and from this shaft the various motions necessary to effect decoration are driven. On the shaft is a pinion $b^3$ driving a spur wheel $c$ fixed on a cam shaft $c^1$ this cam shaft carrying cams $d$, $d^1$, $d^2$, $d^3$, $d^4$, $d^5$, $d^6$, $d^7$, $d^8$, and $d^9$. Cam $d^1$ is arranged to engage with a slide $e$ carried by the frame of the machine such slide having bowls $e^1$ between which the cam works. The slide is connected by a rod $e^2$ with a pawl lever $e^3$ carrying a pawl $e^4$ adapted to engage with the ratchet wheel $e^5$ fixed on the shaft $e^6$ of the table $a^2$, the ratchet mechanism being arranged to move the table through about one fourth of a circle but preferably a little over, the cam being arranged to allow of the table stopping a sufficient length of time to enable the required decoration to be effected, such decoration taking place simultaneously at three different points on the table while at the fourth point the fully decorated article is taken away from the table and replaced by another article to be decorated. A greater number of decorative operations can however be carried on in accordance with the diameter of the table and the amount of angular movement through which it is moved by the ratchet mechanism this being determined by the character of the decoration to be effected, being more when a plurality of colors or operations are being performed on the ware.

In order to insure the table being arrested and retained at a particular point while decoration is being effected I form on the table a number of projections $a^4$ against which a slide $f$ is moved just after the ratchet wheel has been operated such slide being carried in suitable bearings $f^1$ of an antifriction character. The slide has connected to it a rod $f^2$ which in turn is connected to a pivoted rocking lever $f^4$ whose upper end is in contact with and is operated by cam $d^4$ on shaft $c^1$, a spring being employed to insure contact if necessary. The slide $f$ pushes the table back against a weighted pivoted stop $f^5$ arranged at the opposite side of the table and over which the table rotates when passing to the decorating position. It is to be observed that the stop $f^5$, is pivoted intermediate its length and that the lower end of this stop is weighted. This arrangement readily permits the table to pass over the stop $f^5$, when moving in one direction and that the stop $f^5$, in view of the fact that its lower end is weighted effectually holds the table against movement in an opposite direction. The slide recedes during or immediately after decoration to allow the table $a^2$ to be given further rotary motion. To prevent the table moving too quickly a suitably-arranged brake device consisting of a spring $g$ adapted to bear against a disk $g^1$ fixed on the shaft $e^6$ is employed though any other suitable retarding device may be employed.

The table $a^2$ is arranged to carry a plurality of chucks for supporting the article to be decorated, the chucks shown in the drawings being particularly adapted for holding a cup. The chuck is shown to an enlarged scale along with its attendant mechanism in Figs. 20 to 22 from which it will be seen that mounted on the table $a^2$ is a tubular bracket $g^3$ carrying bolster and footstep bearings $g^4$ for a shaft $h$ which has fixed upon it a disk $h^1$ having pins to support springs $h^2$ upon which rest the chuck proper $h^3$ which is formed internally to conform to the cup or other article to be decorated. In the case of a cup the chuck is slotted at $h^4$ to receive the handle of the cup $h^5$ resilient pads $h^6$ being arranged in the slot, if required, as indicated in Fig. 21 so as to hold the handle in an elastic manner. The shaft $h$ carries a feather to engage with a groove in the chuck $h^3$. As in some cases the cup requires to be held stationary in its chuck, that is non-rotary, for some operations while for others it is required to rotate I arrange a locking and releasing device in connection with the shaft $h$. For this purpose the latter is slotted at $i$ to receive the end of a spring-controlled pin $i^1$ carried by the table $a^2$ the outer end of the pin carrying a bracket on which is mounted an anti-friction bowl $i^2$.

Figure 6:
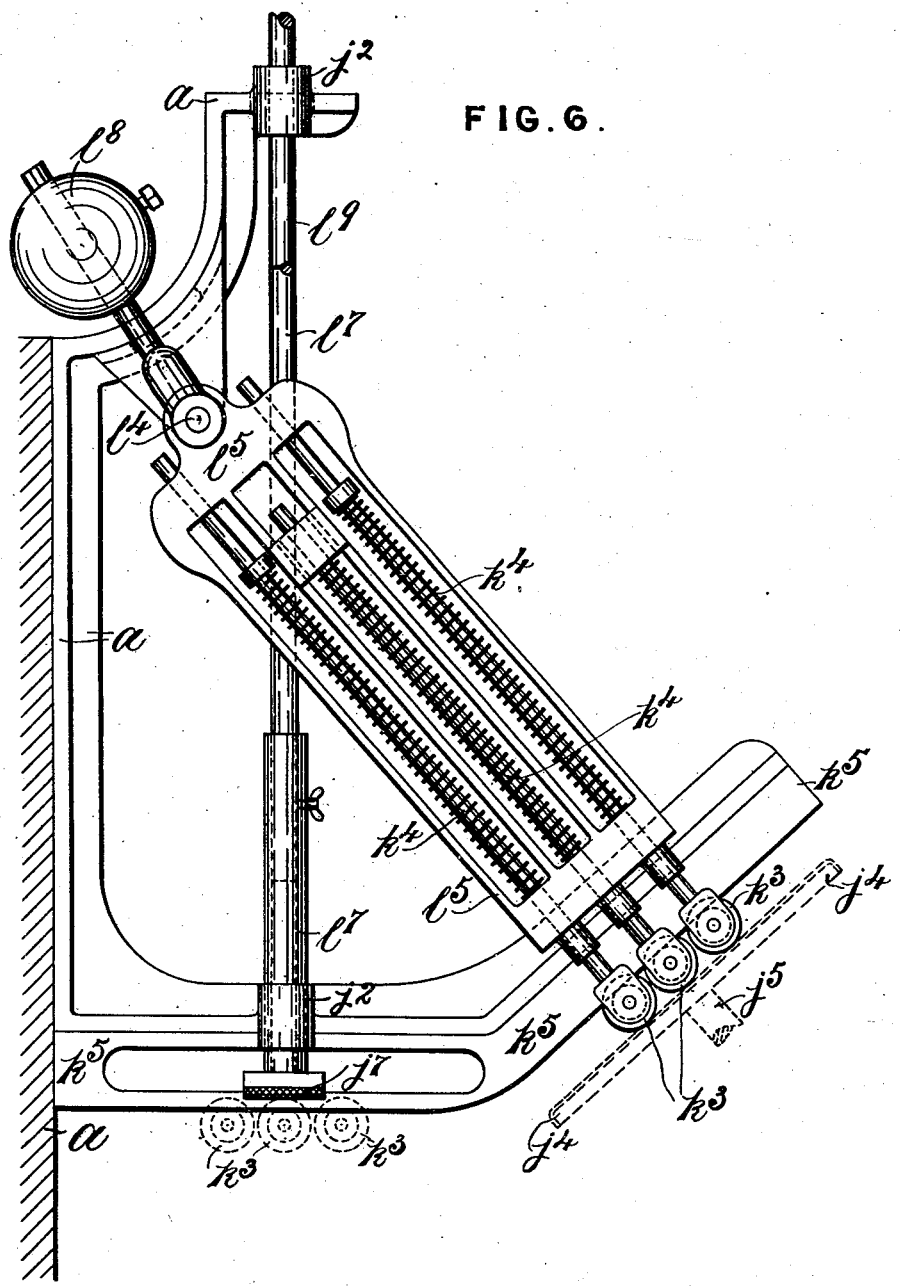
Figure 7:
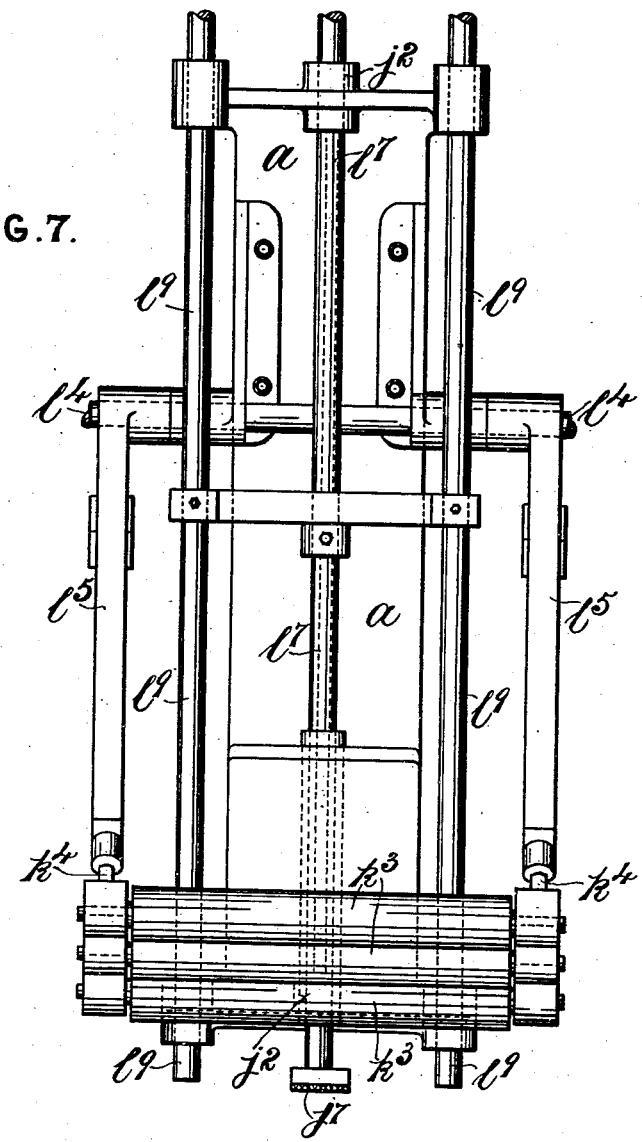
Figure 8:
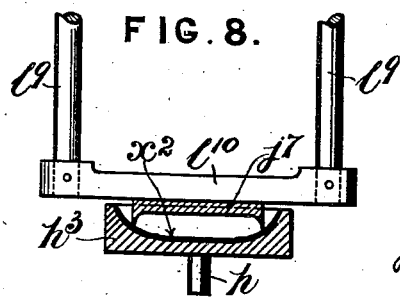

When the cup is placed in position indicated by 1 (see Fig. 17) the pin $i^1$ engages with the slot $i$ as in Fig. 22 thereby keeping the chuck $h^3$ stationary. It remains in this position while the base, and handle are being decorated, this occurring at position 2 (Fig. 17) while at position 3 of the same figure the chuck is required to be rotated while external decoration of the body of the cup is being carried out after which in position 4 the chuck is again fixed while its upper edge is being decorated. To free the chuck in position 3 the bowl $i^2$ engages with a fixed cam plate $i^3$ such plate withdrawing the pin from the slot $i$ so allowing the cup to be rotated by the decoration device hereinafter referred to. On decoration being effected and the table $a^2$ again rotated the chuck is rotated until the pin $i^1$ again engages with slot $i$ by disk $h^1$ coming in contact with a fixed curved plate $i^4$ when the chuck is again fixed as position 4 is reached where it receives the edge decoration already referred to. The chuck $h^3$ is provided with a surface $i^5$ which will be hereinafter particularly referred to, The number of chucks and their attendant mechanism is varied in accordance with the number of operations to be carried out on the cup during one rotation of the table $a^2$.

Where it is desired to impress a pattern at the inside of the base of the cup I usually, though not necessarily, make this the first operation and carry it out by mechanism operated from cam $d^3$ and devices more particularly illustrated in Figs. 6 to 8. Cam $d^3$ is adapted to operate a lever $j$ pivoted on shaft $j^1$, the free end of said lever being connected to a rod mounted in bearings $j^2$ such rod having at its lower end a pattern device $j^7$ consisting of a pad of india rubber sponge or other resilient material bearing on its external face a pattern of any desired character. This rod is moved up and down at the required time by the cam and lever just described and while in the uppermost position has the color or gold to be impressed on the ware transferred to its surface prior to descending into the cup. The color or other material is supplied from a drip bottle $j^3$ or other color supplying device located in a convenient position, the drops of color descending to a rotatable disk $j^4$ mounted on a shaft $j^5$ such disk being capable of adjustment in an axial direction by means of a screw $j^6$ engaging with its shaft. In addition to this axial adjustment the disk is given a rotary motion in order to admit of the color being properly distributed upon its surface, such motion being obtained by means of a ratchet wheel $k$ operated by a spring-controlled pawl rod $k^1$ carried in suitable bearings $k^2$ and actuated by cam $d^8$ from cam shaft $c^1$. The color is transferred from the disk $j^4$ to the pattern device $j^7$ by means of color distribution rollers $k^5$ carried in bearings mounted on spring-controlled rods $k^4$, the bearings of such rollers being adapted to contact with a cam-shaped bracket $k^5$ of a stationary character and clearly shown in Fig. 6, such figure indicating the distribution rollers in full lines in contact with the disk $j^4$ and in broken lines transferring the color to the pattern device $j^7$. The requisite movement from and to the position described is obtained by means of two cams $d^5$ and $d^6$ on the cam shaft $c^1$ cam $d^5$ operating a slide $l$ mounted on the frame of the machine in a backward direction so as to bring the distribution rollers into contact with the disk $j^4$ while cam $d^6$ moves the slide in the opposite direction for bringing the rollers into contact with the pattern device $j^7$. The slide is coupled to a rod $l^2$ in an anjustable way to a lever $l^3$ mounted on shaft $l^4$, such shaft having fixed to it the brackets or frames $l^5$ supporting the spring-controlled rods and rollers. Cams $d^5$ and $d^6$ contact with anti-friction bowls $l^6$ mounted in the slide $l$. The color transferring motion is timed to work in unison with the motion for operating the rod $l^7$ to which the pattern device $j^7$ is attached so that the pattern is stamped on the bottom of the cup on the rod descending and while the table $a^2$ is stopped.

$l^3$ is a balance weight.

Figure 9:
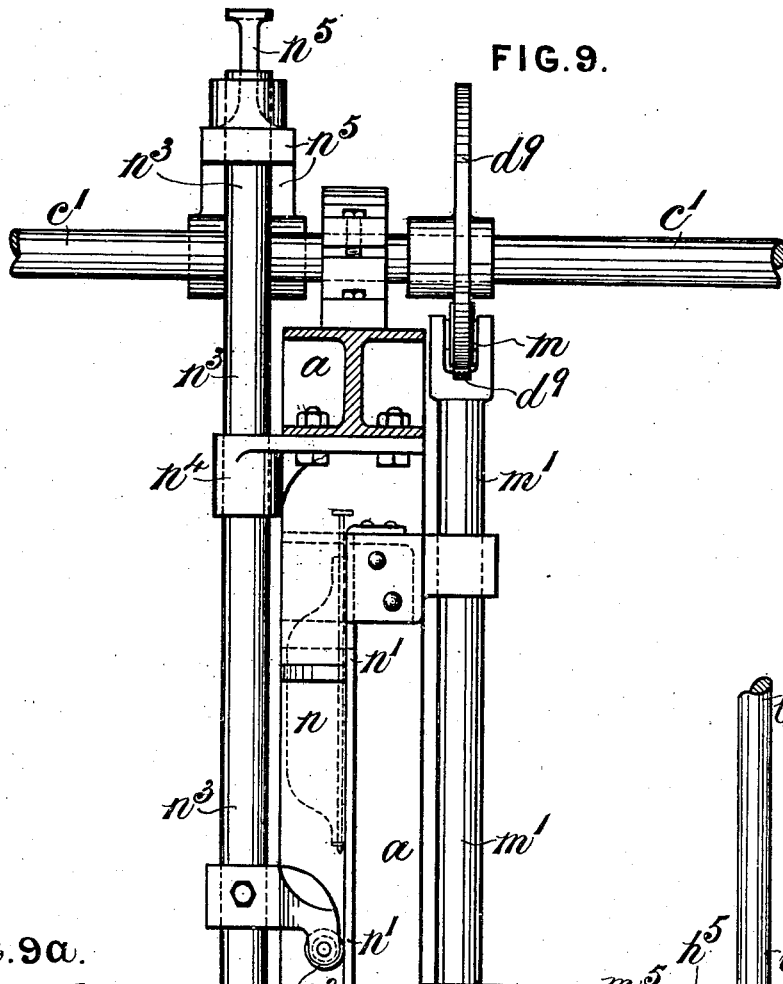
Figure 9A:
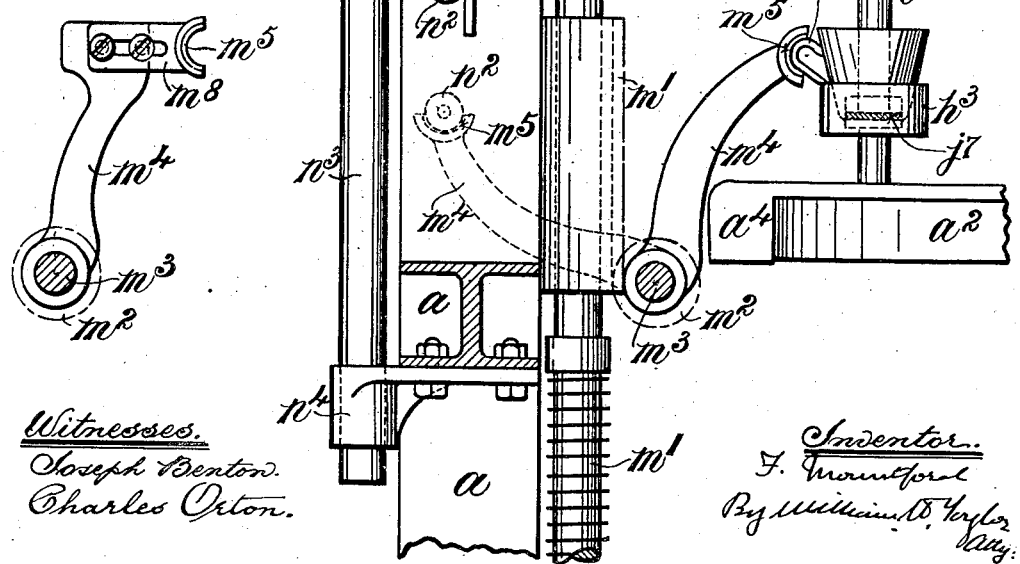
Figure 10:
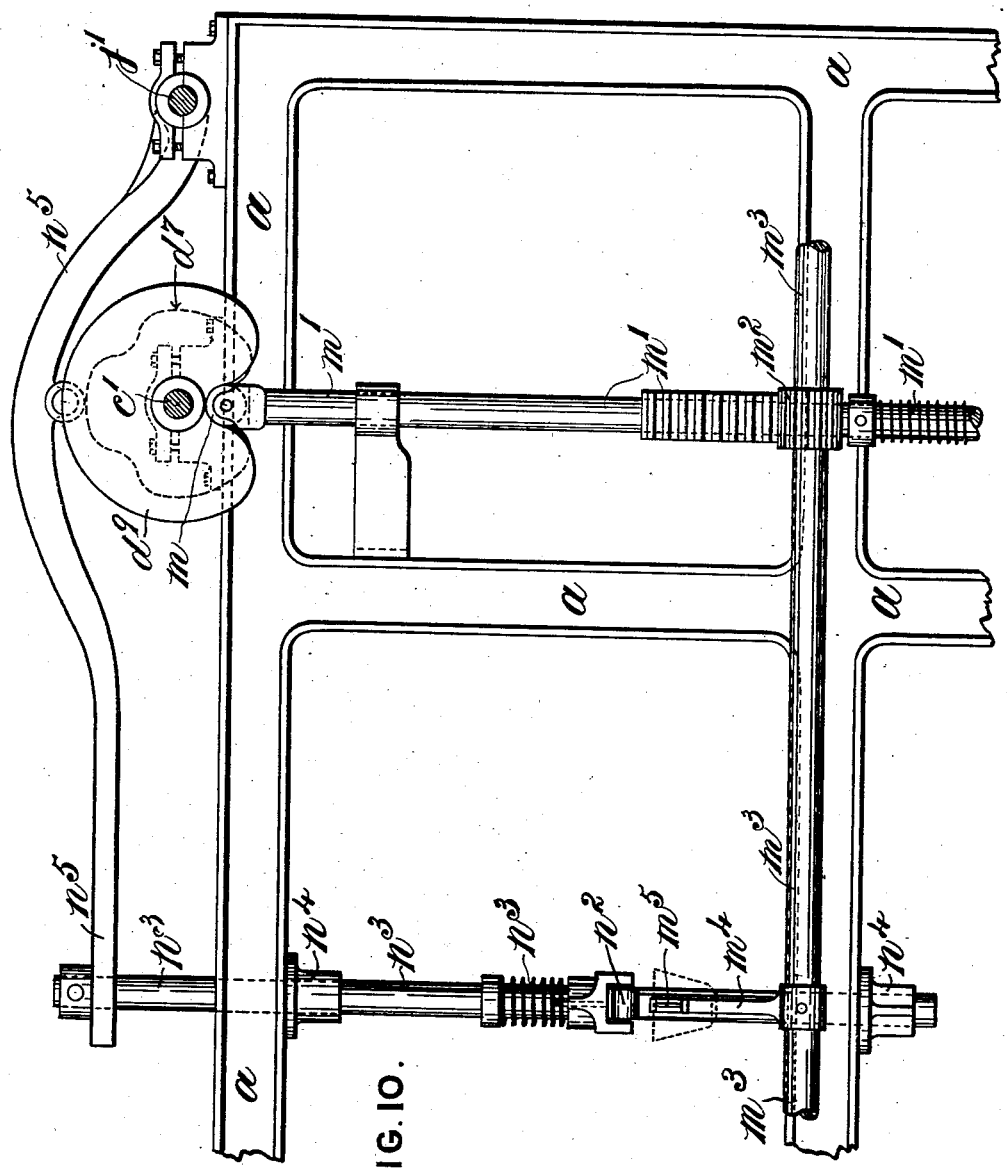

While the pattern is being transferred to the bottom of the cup I also decorate, if desirable, the outside of the handle of such. This operation is carried out by a device such as is illustrated in Figs. 9 and 10 and is adapted to put a line or streak of color on the circular portion of the handle. This device is operated from cam shaft $c^1$ by cam $d^9$ acting against a bowl $m$ carried at the upper end of a spring-controlled rod or rack $m^1$ the spring in conjunction with which tends to press the rod normally in an upward direction. The rack engages with a pinion $m^2$ carried by shaft $m^3$ so that the reciprocatory motion of the rack is converted into a rotary motion of the shaft $m^3$. Fixed on the latter is a lever $m^4$ the free end of which carries a resilient pattern pad $m^5$ of a curved character. Fig. 9 shows this pattern pad and lever in full lines engaging with the handle of a cup and in broken lines in the position to receive color from the color-supplying device. Such latter device may consist of a drip bottle $n$ containing the color and mounted against a distribution plate $n^1$ of a fixed character. In conjunction with the plate I employ a roller $n^2$ carried by a bracket from a rod $n^3$ mounted in bearings $n^4$ and raised and lowered from its upper end by a lever $n^5$ pivoted on a shaft $j^1$ such lever being operated by cam $d^7$ on cam shaft $c^1$. By the means described the color is distributed on the plate and is afterwards transferred to the pad $m^5$ by the roller $n^2$, the requisite motions being arranged in unison with each other.

In Fig. $9^a$ the lever $m^4$ has connected to it an adjustable bracket $m^8$ to enable the pattern pad $m^5$ to be adjusted in relation to the movement of the said lever. Such pattern pad device may if required be mounted on a universal joint so as always to conform readily to the cup handle.

Figure 19:
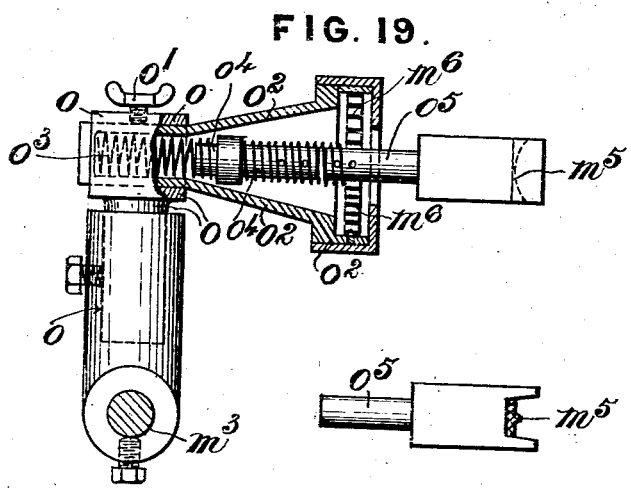

Fig. 19 shows a modified form of such a universal or flexible device. It consists of a bracket fixed on shaft $m^3$ carrying an adjustable stud $o$ to which is connected by set-screw $o^1$ a tubular sleeve $o^2$ in the interior of which and at its outward end is a spring $o^3$ supporting the outer end of a short shaft $o^4$, the inner end of which is supported by a spring which also in turn supports the outer end of a second shaft $o^5$, the inner end of which carries the pattern pad $m^5$. The shaft $o^5$ is further supported by a coiled clock spring $m^6$ carried by the tubular bracket or sleeve $o^2$. This device enables a resilient motion to be obtained in the direction of the axis of the shafts $o^4$ and $o^5$ while lateral resiliency is obtained by the clock spring and also to a certain extent resiliency in a rotary direction so that the pattern pad $m^5$ is enabled to conform to handles of cups which have not been put on straight by the potter or which warp in the kilns.

Figure 11:
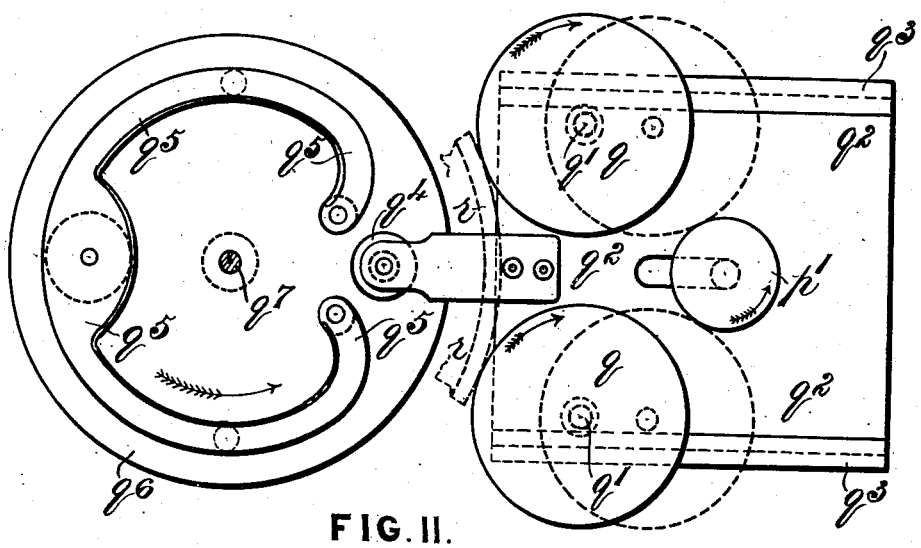
Figure 12:
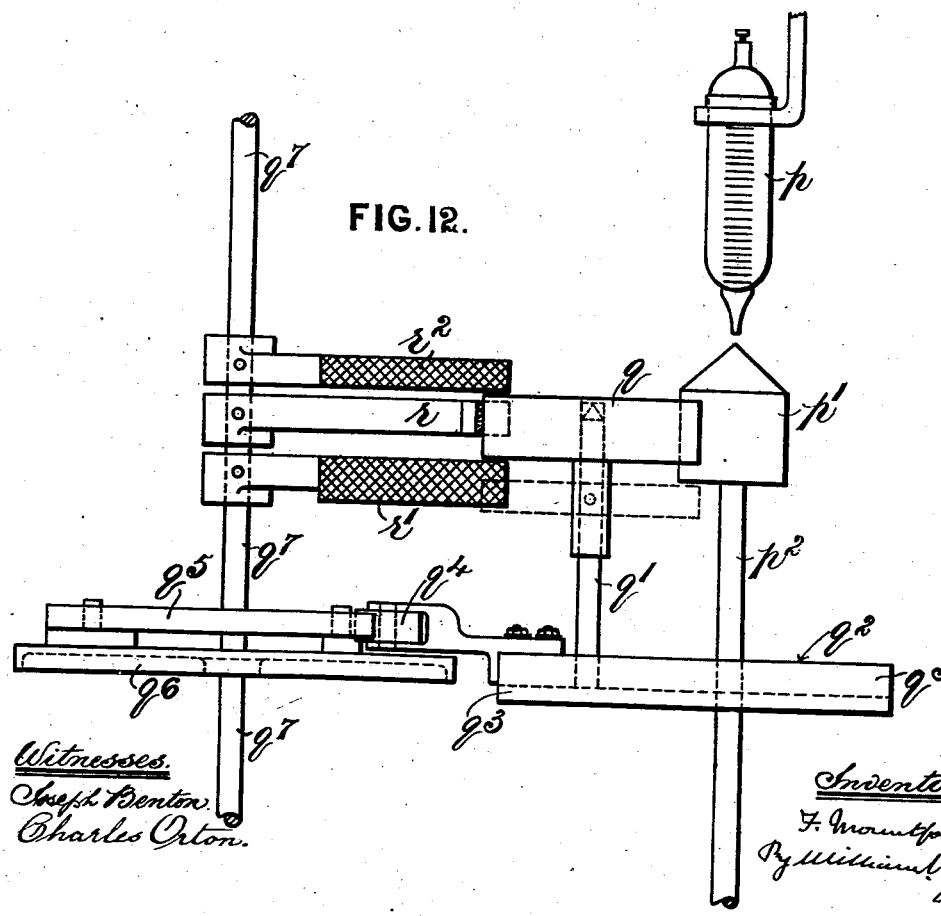
Figure 17:
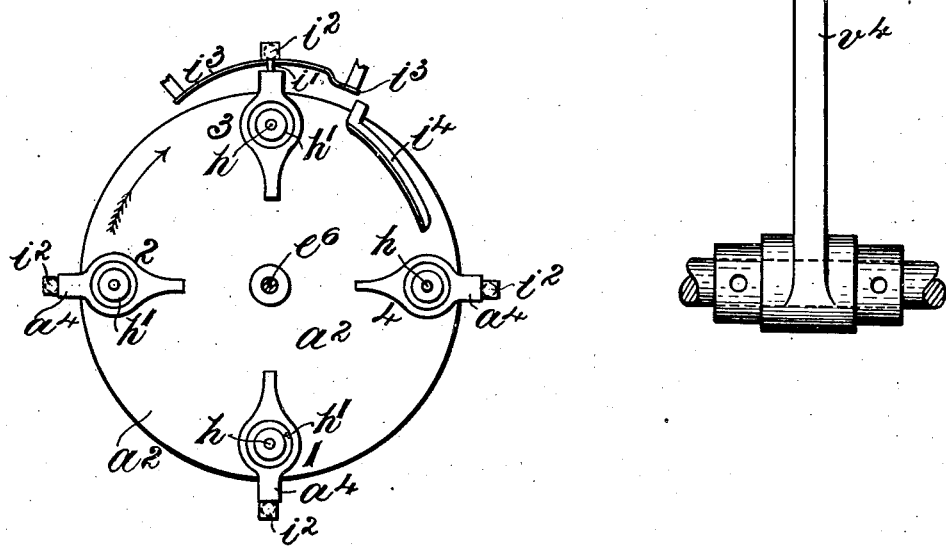

A pattern is transferred to the exterior of the cup by means of the device principally illustrated in Figs. 11 and 12 while the cup occupies position 3, Fig. 17 and while the chuck is free to rotate, and it is an essential and important point of my invention that the cup be rotated by frictional devices, which may be in the case of heavy patterns, the pattern pad itself or in the case of light and delicate patterns by a frictional device adapted to engage with the chuck $h^3$, so that light lines or delicate patterns do not become blurred during transference of color. The device consists of a color drip bottle $p$ or other device supported in a convenient position above a conical and cylindrical roller $p^1$ mounted on shaft $p^2$ driven by pulley $p^3$ from an endless band passing round adjustable guide pulleys $p^4$ and also round a rope pulley $p^5$ on the main driving shaft $b^2$ though, of course, the rotary motion may be imparted by spur gear mechanism. Effective distribution of the color is obtained by means of drums or rollers $q$ loosely mounted on shafts $q^1$ carried by a slide $q^2$ mounted in a bracket $q^3$ the movement of such slide being effected by a bowl $q^4$ adapted to contact with a cam $q^5$ of an interchangeable character for cams of different shape and carried by a disk $q^6$ fixed on vertical shaft $q^7$ such shaft being given rotary motion from cam shaft $c^1$ by bevel or other suitable gear $q^8$. The color is transferred from the conical and cylindrical roller to the distribution drums which are moved forward by the cam devices just described just as the color pad is ready to receive the color. Such color pad $r$ is fixed on shaft $q^7$ and is curved from the center of such shaft so that it may receive color from both drums $q$ after which the pad continues its rotary motion to transfer the color to the outside of the cup. This it does in the case of a heavy pattern by contact with the cup itself, though in delicate patterns a separate friction device is employed to obtain rotary motion. Such a device consists of a sector $r'$ mounted on shaft $q^7$ such sector being adapted to engage with the surface $i^5$ of chuck $h^3$ which being free to revolve as already described is acted upon simultaneously with the transference of color or gold.

After exterior decoration has been effected in the manner just described the chuck $h^3$ is held stationary while the decoration of the cup edge is effected the movement of the chuck to the stationary position being effected as already partly described, by means of the stationary cam plate $i^4$ against which a second sector $r^2$ fixed on shaft $q^7$ engages. A pattern may be transferred in intaglio to the articles by employing suitable pattern devices when the articles are in the "clay" state and suitable arrangements may be made to impress a wax-covering on the article with designs or words so they may be afterwards etched by acid.

Figure 2:
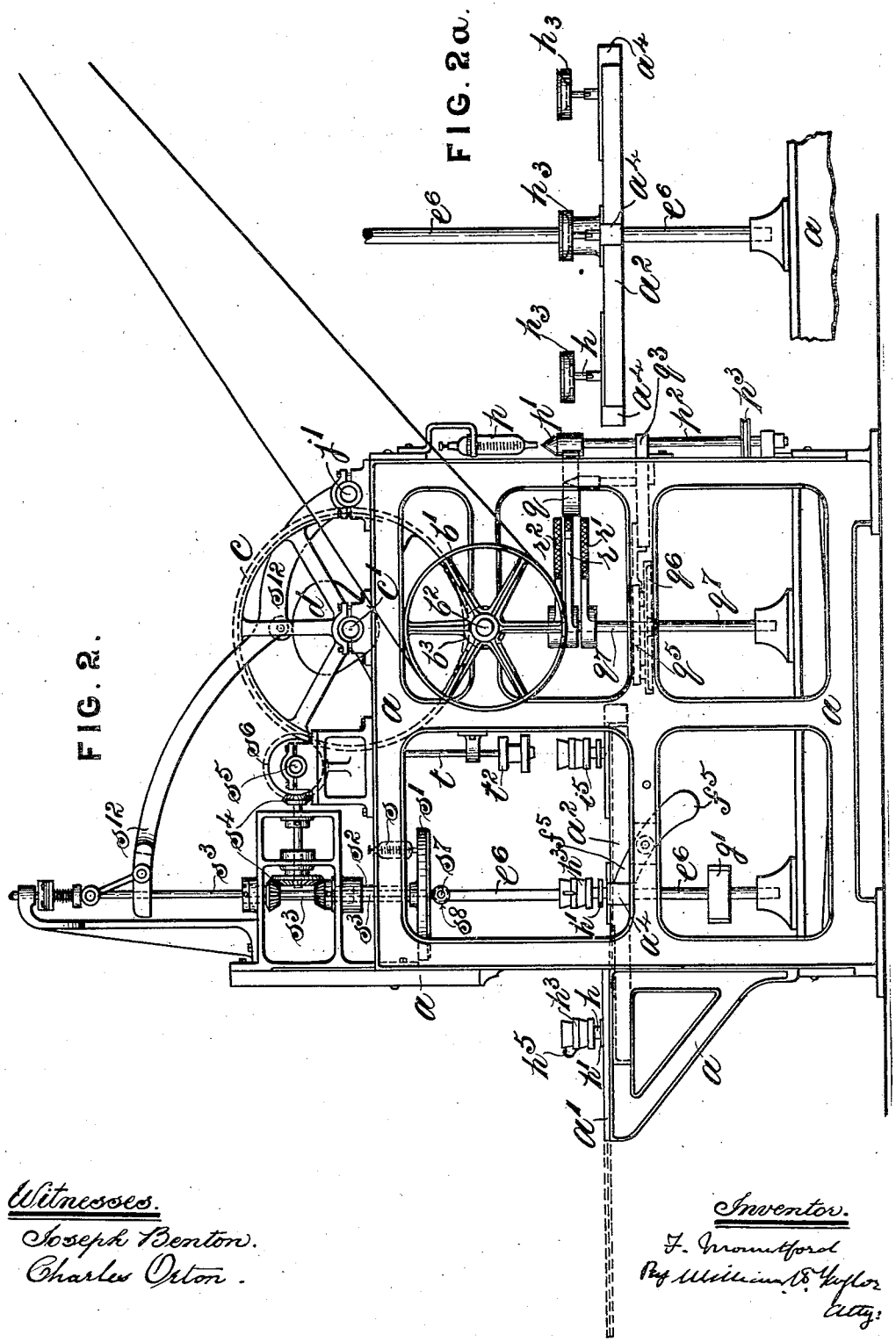

The decoration of the upper edge of the cup is effected by the device more clearly indicated in Fig. 2 in which $s$ is a color drip bottle carried by a disk $s^1$ so that the color may drip through the disk on to its under face. The disk is mounted on sleeve $s^2$ and is stationary, while passing through the sleeve is a shaft $s^3$ to which rotary motion is given by bevel gear $s^4$ from shaft $s^5$ which in turn carries a pinion $s^6$ driven by spur wheel $c$ on cam shaft $c^1$. Shaft $s^3$ is also given a longitudinal reciprocatory movement in addition to the rotary movement by means of cam $d$ on cam shaft $c^1$ acting on lever $s^{12}$ pivoted on shaft $j^1$, the free end of lever $s^{12}$ being coupled to the upper end of shaft $s^3$, a feather and groove device enabling the shaft to be actuated in the manner described. At the lower end of shaft $s^3$ is a cross head $s^7$ carrying color distribution rollers $s^8$ such rollers distributing and receiving color on and from the disk $s^1$ while in the upper position indicated in Fig. 2 while on descending and still rotating the rollers transfer the color to the upper edge of the stationary cup. On the next movement of the table $a^2$ the cup comes to the first position again when it may now be removed by the operator and a fresh cup or other article be substituted to be carried through the operations as already described.

Figure 3:
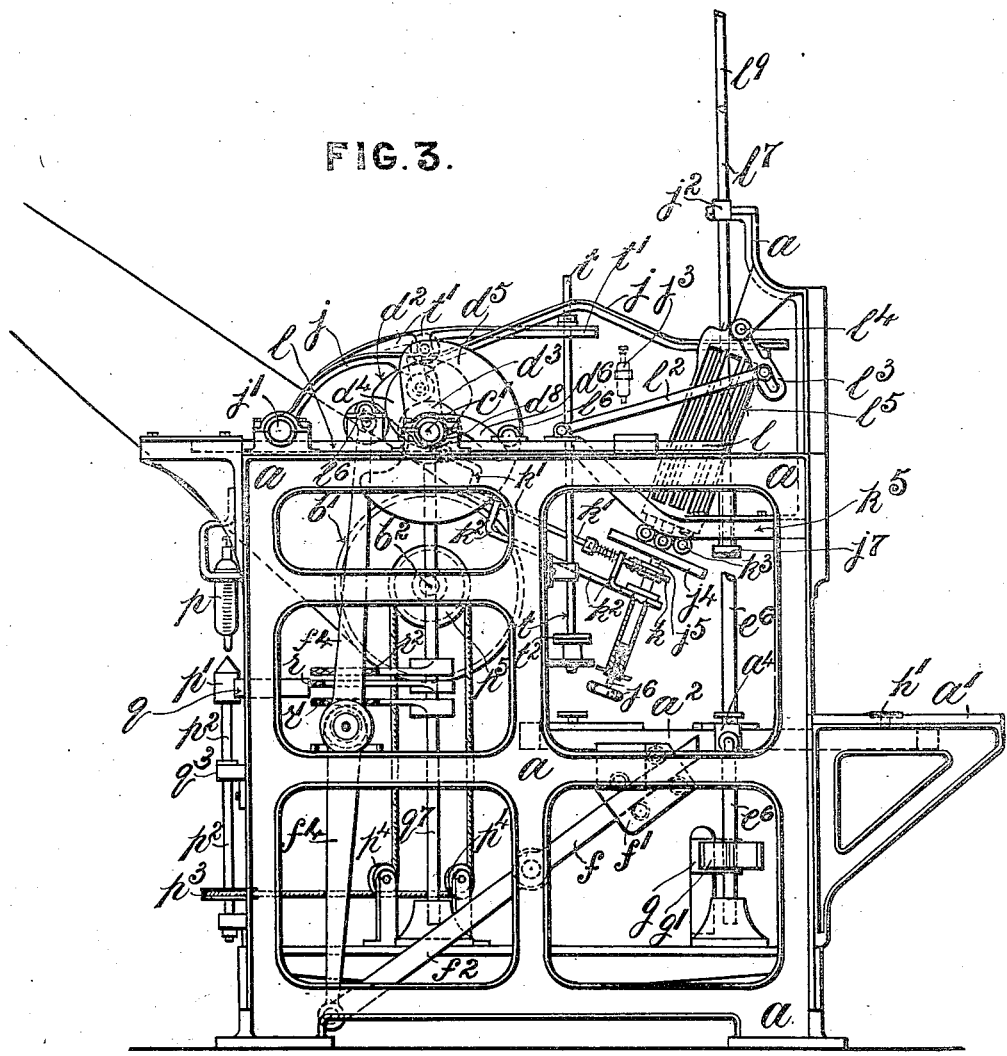
Figure 18:
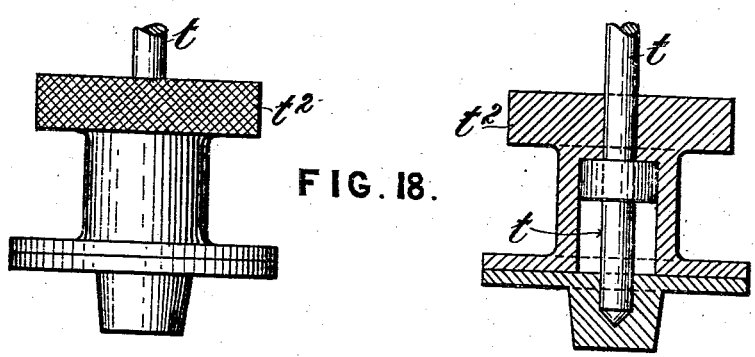

In order to hold the cup down in the chuck while in position 3 (Fig. 17) I employ a device illustrated in Figs. 2 3 and 18. This device consists of a rod $t$ arranged in suitable bearings and capable of being moved up and down by means of cam $d^2$ on shaft $c^1$, such cam operating lever $t^1$ being pivoted on shaft $j^1$, the free end of the lever being coupled to the end of the rod $t$. At the lower end of the rod I employ a compound disk device, consisting of a lower disk of any suitable shape and size adapted to bear against the upper edge of the cup while the exterior decoration is being effected, this disk acting to force the cup and chuck $h^3$ in a downward direction against the influence of the springs below the chuck shown in Fig. 20. The disk may be of a resilient material such as rubber so as not to damage the cup and the upper disk $t^2$ may be frictionally rotated in unison with the rotation of the cup by a second sector $r^3$ fixed on shaft $q^7$ though rotation may be effected by frictional contact of the lower disk only. It should here be said that when the cup rotates in position 3 Fig. 17 the color transferring devices and chuck are so arranged that the handle of the cup comes in contact with one end of the color pad so that decoration can be effected close up to the side of the handle while the color pad is of such a length as to bear a more or less strict relation to the circumference of the cup where decoration is being applied so that by the time the cup has been rotated nearly a revolution the end of the color pad effects decoration close to the cup handle on the other side. A further point in this connection is that the color pad and the rollers which supply color thereto are formed at an angle corresponding with the angle of the cup or other article to be decorated.

Figure 13:
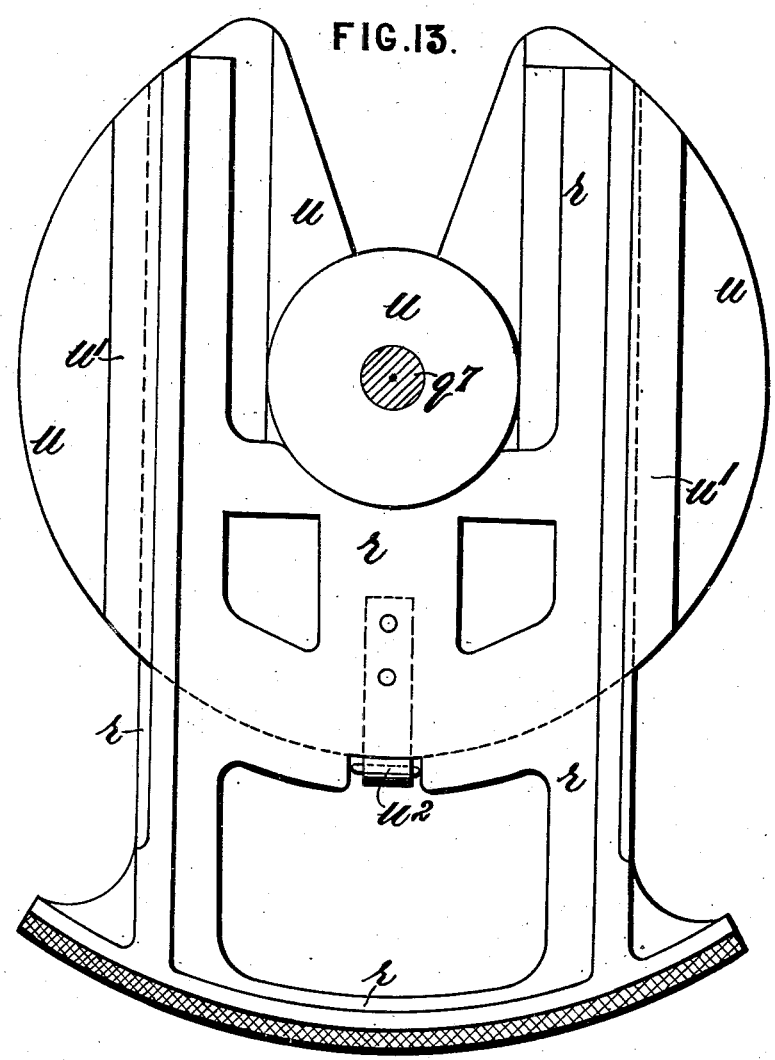
Figure 14:
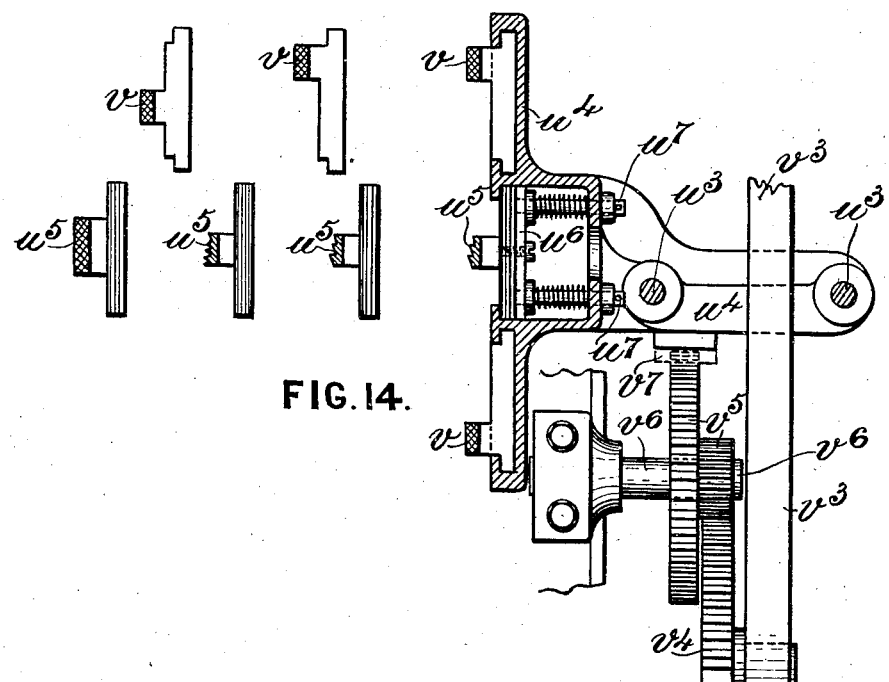

Instead of the color pads $r$ Figs. 11 and 12 being fixed on the shaft $q^7$ as indicated there may be a disk $u$ Fig. 13 fixed on the shaft and provided with slideways $u^1$ to enable a pad frame $r$ to be slid therein, a catch $u^2$ being adapted to hold the pad frame in position. By these means pad frames $r$ are interchangeable, so that frames can be exchanged having different lengths of pattern surface in accordance with the varying diameters of the ware to be decorated. The same principle may be applied to the friction sectors $r^1$ and $r^2$.

I sometimes employ a horizontally reciprocable pattern pad frame for effecting external decoration of the ware at position 3 Fig. 17 instead of using a rotary pattern device such as already described. In such a case I locate to the rear of position 3 guide rods $u^3$ suitably supported on which a horizontal slide $u^4$ is mounted. This slide is adapted to carry interchangeable pattern pads $u^5$, the pattern surfaces of which may vary in length in accordance with the circumference of a cup minus the thickness of the handle so that the cup may be decorated as already described. The pattern pad is attached to a plate $u^6$ by screws or the like and such plate is guided by pins $u^7$ surrounded by springs so as to obtain resiliency and allow it to accommmodate itself to the article to be decorated. The slide $u^4$ also carries frictional surfaces $v$ adapted to engage with the chuck device $h^3$ for rotating them as already described, these friction devices being fixed in position by screws or the like above and below the pattern pads $u^5$, the slide $u^4$ also carries a color slab $u^8$ adjacent to which is a distribution roller $p^1$ mounted on a fixed bracket so that as the slide $u^4$ is reciprocated the color from a dropping bottle or other device is distributed on the slab and afterwards transferred to the pattern pad by the roller. The slide $u^4$ may be reciprocated in any suitable manner but at present I prefer to employ a link or rod $v^3$ operated by a cam or like device, such rod being coupled to a toothed sector $v^4$ gearing with the pinion of a compound wheel $v^5$ mounted on stud $v^6$, such wheel engaging with a rack $v^7$ forming part of or attached to the slide $u^4$.

Figure 23:
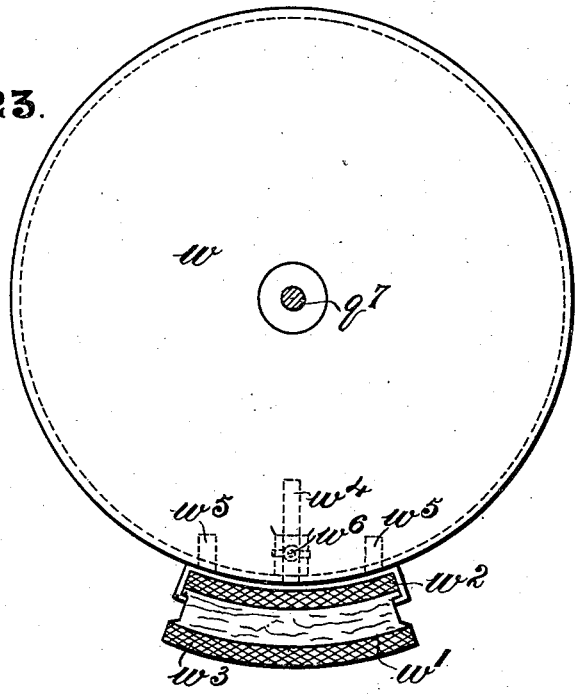
Figure 24:
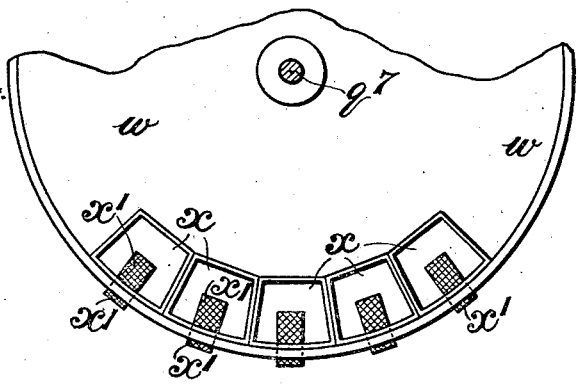

Further modifications of the device for the external decoration of the cup are indicated in Figs. 23 and 24. In the former case $w$ indicates a rotary disk to carry one or a plurality of resilient pattern pads $w^1$, the resiliency being obtained by a sheath of rubber $w^2$ at the back and by the pattern pad $w^3$, a rigid plate of wood or other material being between. The pattern pad is interchangeably secured to the disk $w$ by a shank $w^4$ and steady pins $w^5$, the shank being attached to a clamp $w^6$. In Fig. 24 I have indicated disk $w$ being provided with a number of color wells $x$ each adapted to receive a different color, such wells being provided with porous pads of sponge or other material $x^1$ surrounded by the color and projecting towards the outer edge of the disk $w$, the outer ends having a pattern or a portion of a pattern formed on them so that a design of a variegated character and of different colors can be transferred to the cup during the rotary motion of the disk $w$.

Figure 25:
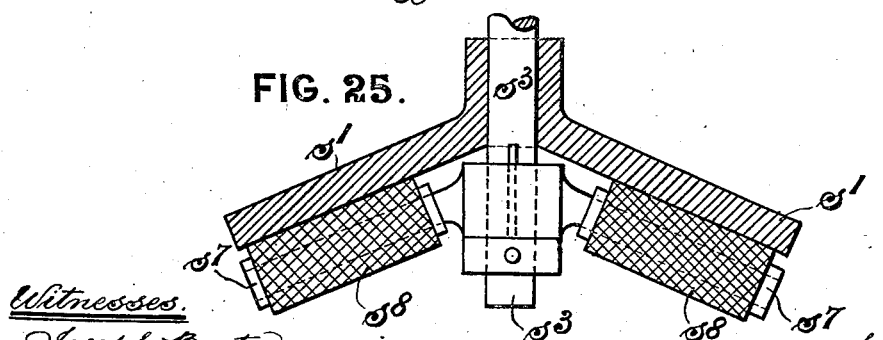

Fig. 25 indicates a modification of a device for decorating the exterior edges of a cup, saucer, or the like in which the color disk $s^1$ corresponding with that shown in Fig. 2 is dished while the color rollers $s^8$ are arranged at any suitable angle in accordance with the ware to be treated. In other respects the device acts in a similar manner to that described in connection with Fig. 2. It is however more especially applicable for saucers or similar shallow articles which in Fig. 2$^a$ are carried by modified chucks $h^3$ on the table $a^2$ already described. Decoration of saucers however can also be carried out by the modified device shown in Fig. 8 in which the rod $l^7$ previously described supports two other rods $l^9$ which carry a cross bar $l^{10}$ supporting a modified pattern pad $j^7$ to decorate the interior or upper face of the saucer carried by the modified chuck $h^3$.

Another modification of the saucer decorating device is indicated in sectional elevation and plan in Figs. 28 and 29 in which $x^2$ is the saucer and $x^3$ a cross head carried by the rod or shaft $x^8$ previously described in connection with Fig. 2 such cross head carrying one or a plurality of color distribution rollers $x^4$ receiving colors from one or more drip bottles or the like $x^5$ carried by the cross head, the rollers transferring color to small color rollers $x^6$ carried by shaft $x^7$ mounted in the cross head.

Fig. 26 indicates a diagrammatic plan in which eight cups may be treated in various operations simultaneously, the table $a^2$ having arranged in conjunction with it at position 4 two or more exterior decoration devices such as already described in connection with Figs. 11 and 12 such arrangement being to enable a plurality of colors to be transferred to the cups.

Fig. 27 indicates a further modification in which the pattern surfaces $r$ are hollow instead of convex as previously described and furthermore are stationary while the table $a^2$ is given a continuous rotary motion enabling a plurality of colors to be transferred to the cups as already described. The rotation of the cups is effected by means of the chucks $h^3$ rotating in contact with the pattern surfaces or with frictional surfaces arranged in conjunction with such pattern pads. In some cases it may be necessary to transfer metallic or other powders to a size or varnish placed on the cups by the pattern surfaces $r$ in which case we arrange stationary boxes $y$ carrying the bronze or other powders in each of which is a frictionally rotatable fabric-covered roller $y^1$ which picks up the powder and transfers it to the size or varnish pattern, excess of size being afterwards brushed off, as the ware is removed from the rotatable table.

From the foregoing description it will be seen that I have devised a machine to entirely replace the hand methods of decorating ware and other articles hereinbefore referred to in one or a plurality of colors, metallic powders, gold, silver, or the like and it will be gathered that by modifying the chuck devices the whole of the exterior of a cup may be decorated in addition to its handle, top edge, and inside base and that the patterns so applied to the articles can be varied as required and as will be well understood by those versed in the art.

By various modifications which do not affect the essential features of the invention various shaped articles can be treated in the manner hereinbefore described.

What I claim as my invention and desire to protect by Letters Patent is:—

1. In a decorating machine for the purposes described an intermittently rotating table adapted to receive one or a plurality of chucks for holding the article to be decorated, a ratchet device for operating said table, a cam and slide device for operating the ratchet, a cam operated slide and lever mechanism for holding the table in a fixed position during decoration and a pivoted stop device arranged in conjunction with the table and with a brake mechanism for preventing overrunning of the table substantially as described.

2. In a decorating machine, a rotatable table, a plurality of chuck devices each adapted to receive the article to be decorated mounted in prearranged positions on the table, a spring catch device for holding the chucks in a fixed position when required, a device for releasing said spring catch and enabling the article to be rotated during exterior decoration and to afterwards again lock the chuck substantially as described.

3. In a decorating machine for the purposes described the means for transferring a pattern to the inside base of the article to be decorated consisting of a vertically reciprocable rod carrying at its lower end a resilient pattern pad, a cam and lever device for effecting reciprocation, a gold or color supplying device in conjunction with the reciprocating rod consisting of a drip bottle, a rotatable color disk, a ratchet and cam device for rotating the disk and a reciprocable frame carrying spring-controlled rollers for transferring the color or gold from the disk to the pattern surface substantially as described.

4. In a decorating machine for the purposes described the means for transferring a pattern to the handle of a receptacle, consisting of a reciprocable lever carrying at its free end a fixed and adjustable pattern pad, a rod and cam and rack and wheel device for moving the lever into position to receive color or gold and to a position for transferring said color or gold to the handle, a drip bottle or other supplying device for the color or gold, a distribution slab, a distribution roller and a rod, lever and cam device for operating the distribution roller so as to transfer the color or gold from the slab to the pattern pad substantially as described.

5. In a decorating machine the combination of a vertically reciprocal device for decorating the inside base of the article to be decorated with a simultaneously-operating gold or color transferring device for putting a pattern on the handle of the article to be decorated substantially as described.

6. In a decorating machine for the purposes described the means for transferring a pattern or design to the exterior surface of the article to be decorated consisting of a drip bottle for the gold or color, a roller adapted to receive the gold or color, means for rotating the roller, distribution drums rotating in contact with the color roller a rotatable pattern pad operating in conjunction with the distribution drums, a rotatable and interchangeable cam device for moving the distribution drums into and out of contact with the color roller and pattern device and a gear device for operating the shaft carrying the rotatable pattern pad so as to transfer gold or color from the distribution drums to the article to be decorated, said rotatable pattern pad rotating the article to be decorated itself when the pattern is of a heavy character by frictional contact therewith substantially as described.

7. In a decorating machine for the purpose described the means for rotating the article to be decorated frictionally when the pattern is of a delicate character consisting in combination with a rotatable pattern pad of a rotatable sector carried by the same shaft as the pattern pad and a chuck having a frictional surface adapted to be engaged by the rotatable sector.

8. In a decorating machine for the purpose described, the combination of a chuck device, of a disk, rollers beneath the disk, and means for imparting a rotary reciprocal motion to the rollers with relation to the disk.

9. In a decorating machine for the purposes described the means for transferring gold or color to the top edge of hollow ware consisting of a drip bottle device containing the gold or color, a disk supporting the drip bottle, a longitudinally reciprocable rod capable also of rotating, spur gear for effecting the rotation of the rod, a cam and lever and buffer device connected with the upper end of the rod and color distribution rollers carried by a cross head beneath the color disk adapted to distribute color on the latter substantially as described.

In testimony whereof I have hereunto set my hand in the presence of two witnesses.

FREDERICK MOUNTFORD.

Witnesses:
WILLIAM HENRY TAYLOR,
FRANK TUTTEN.